(12) United States Patent  
Gellert

(10) Patent No.: US 10,263,413 B2
(45) Date of Patent: Apr. 16, 2019

(54) CHARGING STATION

(75) Inventor: Remo Gellert, Hoyerswerda (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 387 days.

(21) Appl. No.: 14/343,489

(22) PCT Filed: Sep. 7, 2011

(86) PCT No.: PCT/EP2011/065442
§ 371 (c)(1),
(2), (4) Date: Mar. 7, 2014

(87) PCT Pub. No.: WO2013/034177
PCT Pub. Date: Mar. 14, 2013

(65) Prior Publication Data
US 2014/0217978 A1 Aug. 7, 2014

(51) Int. Cl.
H02J 7/00 (2006.01)
H02H 7/20 (2006.01)
(Continued)

(52) U.S. Cl.
CPC .............. H02H 7/20 (2013.01); B60L 3/00 (2013.01); B60L 11/1816 (2013.01);
(Continued)

(58) Field of Classification Search
USPC ...................................................... 320/109
See application file for complete search history.

(56) References Cited

U.S. PATENT DOCUMENTS 5,815,357 A * 9/1998 Innes ..................... H02H 3/083
361/85
6,559,559 B2 5/2003 Cratty
(Continued)

FOREIGN PATENT DOCUMENTS

CN 1333589 A 1/2002
CN 1441990 9/2003
(Continued)

OTHER PUBLICATIONS

Chinese Office Action for related Chinese Patent Application No. 201180073242.8, dated Jul. 28, 2015, 17 pages.
(Continued)

Primary Examiner — Samuel Berhanu
(74) Attorney, Agent, or Firm — Slayden Grubert Beard PLLC

(57) ABSTRACT

A single-phase or multi-phase feed line is connected to a charging connection of the charging station, via which feed line the charge current flows to the charging connection of the charging station regardless of the load capacity identifier of the charge cable. An overload protection device is connected to and monitors the feed line. The overload protection device is an automatically switching overload protection device in which at least one identifier-specific trigger criterion is stored for each of at least two load capacity identifiers of the charging cable. The overload protection device is capable of automatically selecting the identifier-specific trigger criterion assigned to the load capacity identifier depending on the load capacity identifier of the charging cable, and of shutting off a switching device of the overload protection device arranged in the feed line depending on the selected trigger criterion.

20 Claims, 4 Drawing Sheets

(51) Int. Cl.
  *B60L 11/18* (2006.01)
  *B60L 3/00* (2019.01)

(52) U.S. Cl.
  CPC ......... *B60L 11/1824* (2013.01); *H02J 7/0031* (2013.01); *B60L 2230/20* (2013.01); *Y02T 10/7005* (2013.01); *Y02T 10/7072* (2013.01); *Y02T 10/7088* (2013.01); *Y02T 90/12* (2013.01); *Y02T 90/121* (2013.01); *Y02T 90/14* (2013.01)

(56) References Cited

U.S. PATENT DOCUMENTS

| | | | |
|---|---|---|---|
| 7,342,762 B2 | 3/2008 | Harris, IV | |
| 8,335,062 B2 * | 12/2012 | Haines | H02H 3/00 |
| | | | 320/109 |
| 2011/0098865 A1 | 4/2011 | Kitano et al. | |
| 2011/0110009 A1 * | 5/2011 | Sugimoto | H03K 17/0822 |
| | | | 361/93.1 |
| 2011/0273139 A1 * | 11/2011 | Hofheinz | B60L 3/0023 |
| | | | 320/109 |
| 2012/0119702 A1 * | 5/2012 | Gaul | B60L 3/0069 |
| | | | 320/109 |
| 2012/0140371 A1 | 6/2012 | Gaul et al. | |
| 2012/0286729 A1 * | 11/2012 | Yegin | B60L 3/0069 |
| | | | 320/109 |

FOREIGN PATENT DOCUMENTS

| | | |
|---|---|---|
| CN | 1976156 | 6/2007 |
| CN | 102044909 | 5/2011 |
| DE | 102009034886 | 2/2011 |
| DE | 102009034887 | 2/2011 |
| WO | PCT/EP2011/065442 | 9/2011 |

OTHER PUBLICATIONS

English Language International Search Report for PCT/EP2011/065442, dated Jan. 21, 2013, 3 pages.

IEC 61851-1, "Electric vehicle conductive charging system—Part 1: General requirements," International Standard, Edition 2.0, XP008147718, 2010, 104 pages.

WIPO English Language Translation of Written Opinion for PCT/EP2011/065442, Downloaded from WIPO Website Mar. 7, 2014, 8 pages.

* cited by examiner

CHARGING STATION

CROSS REFERENCE TO RELATED APPLICATIONS

This application is based on and hereby claims priority to International Application No. PCT/EP2011/065442 filed on Sep. 7, 2011, the contents of which are hereby incorporated by reference.

BACKGROUND

The invention relates to a charging station.

Charging stations are distributed, for example, by Siemens AG under the product names Charge CP700A and CP500A. Said charging stations are equipped with an electric charging connection for connecting a charging cable of an electric vehicle, and are able to read, at the charging connection, a load capacity identifier specifying the electrical load capacity of the connected charging cable. The charging stations have overload protection devices for disconnecting the charging current in the event of an overload.

Charging stations of this type are furthermore also known, for example, from the following documents:

"IEC 61851-1:2010—Electric vehicle conductive charging system—Part 1: General requirements", INTERNATIONAL STANDARD—IEC NORME INTERNATIONALE—CEI, X, XX, vol. ed2.0, No. IEC 61851-1:2010, Nov. 25, 2010 (11-25-2010), pages 1-104, XP008147718;

DE 10 2009 034 886 A1 and DE 10 2009 034 887 A1.

SUMMARY

One possible object is to specify a charging station which enables reliable monitoring of the charging process but yet can be manufactured inexpensively.

The inventor proposes a charging station. With the charging station, a single-phase or polyphase feed line is connected to the charging connection of the charging station, via which feed line the charging current flows regardless of the load capacity identifier of the charging cable to the charging connection of the charging station, and the overload protection device is connected to the feed line and monitors same, wherein the overload protection device is an overload protection device with automatic switchover, in which in each case at least one identifier-specific tripping criterion is stored for at least two load capacity identifiers of the charging cable, and wherein the overload protection device is suitable for automatically selecting, on the basis of the load capacity identifier of the charging cable, the at least one identifier-specific tripping criterion assigned to the load capacity identifier and for disconnecting a switching device, arranged in the feed line, of the overload protection device on the basis of the selected tripping criterion.

An important advantage of the proposed charging station is that the charging process can be completely monitored by a single overload protection device. The reason is that, in the case of the proposed charging station, the charging current is always conducted via one and the same single-phase or polyphase feed line to the charging connection of the charging station regardless of the load capacity identifier of the charging cable, with the result that it is possible to effectively control the charging process with a single overload protection device by simply monitoring said (central) feed line. It goes without saying that yet further or additional overload protection devices can, for example for reasons of redundancy, be connected to just said (central) feed line or at another location, if this is desired for reasons of safety.

A charging station of this type can be manufactured in a particularly simple and therefore advantageous manner if the overload protection device has a memory in which the at least two identifier-specific tripping criteria are stored.

The overload protection device preferably has a calculation device which is connected to the memory and is suitable for reading from the memory, on the basis of the respective load capacity identifier of the connected charging cable, the at least one identifier-specific tripping criterion which is assigned to said load capacity identifier and stored in the memory.

With regard to a particularly high level of failsafety, it is considered to be advantageous if the overload protection device is directly connected to the charging connection and is suitable for reading the load capacity identifier of the connected charging cable by itself (or without the mediation of other components).

By way of example, maximum current values, tripping characteristics and/or calculation guidelines, which need to be used by the calculation device during the evaluation of the measured charging current, are stored as load-capacity-specific tripping criteria. Therefore, the term tripping criterion is intended to be understood in the widest sense thereof.

It is considered to be advantageous if the overload protection device has a measuring device which is connected to the calculation device and determines a measured value, which specifies the loading of the feed line, and transfers said measured value to the calculation device. The measuring device can be a current measuring device, for example, which measures the current through the feed line.

The feed line can be a single-phase or polyphase feed line. In the case of a polyphase feed line, it is considered to be advantageous if the overload protection device with automatic switchover monitors one, several or all of the phases of the polyphase feed line.

In the case of a polyphase feed line, it is considered to be advantageous if phase-specific monitoring and control takes place. Preferably, the overload protection device is suitable for disconnecting the phases of the polyphase feed line regardless of the symmetry of the current loading in the phases of the feed line.

According to a particularly preferred configuration, it is provided that the switching device has an individually actuable switch for each phase of the polyphase feed line, and the overload protection device is configured such that it individually monitors the phases of the polyphase feed line and individually disconnects them in the event of an overload.

In order to achieve remote parameter setting for the overload protection device, it is considered to be advantageous if the overload protection device has an interface module, and the control device of the overload protection device is programmed such that it is possible to change the identifier-specific tripping criteria by remote parameter setting.

The inventor also proposed a method for monitoring the charging process of a charging station, a charging cable, which provides a load capacity identifier, of an electric vehicle being connected to the electric charging connection of said charging station.

With respect to a method such as this, a feed line, which is connected to the charging connection of the charging station and via which the charging current flows, regardless of the load capacity identifier of the charging cable, to the charging connection of the charging station, is monitored by an overload protection device with automatic switchover, wherein, on the basis of the load capacity identifier of the charging cable, an identifier-specific tripping criterion assigned to the load capacity identifier is read from a memory of the overload protection device and a switching device arranged in the feed line is disconnected in the event of an overload, which is determined by the overload protection device according to the selected tripping criterion.

With respect to the advantages of the method, reference should be made to the advantages of the charging station which are explained above, since the advantages of the charging station substantially correspond to those of the method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
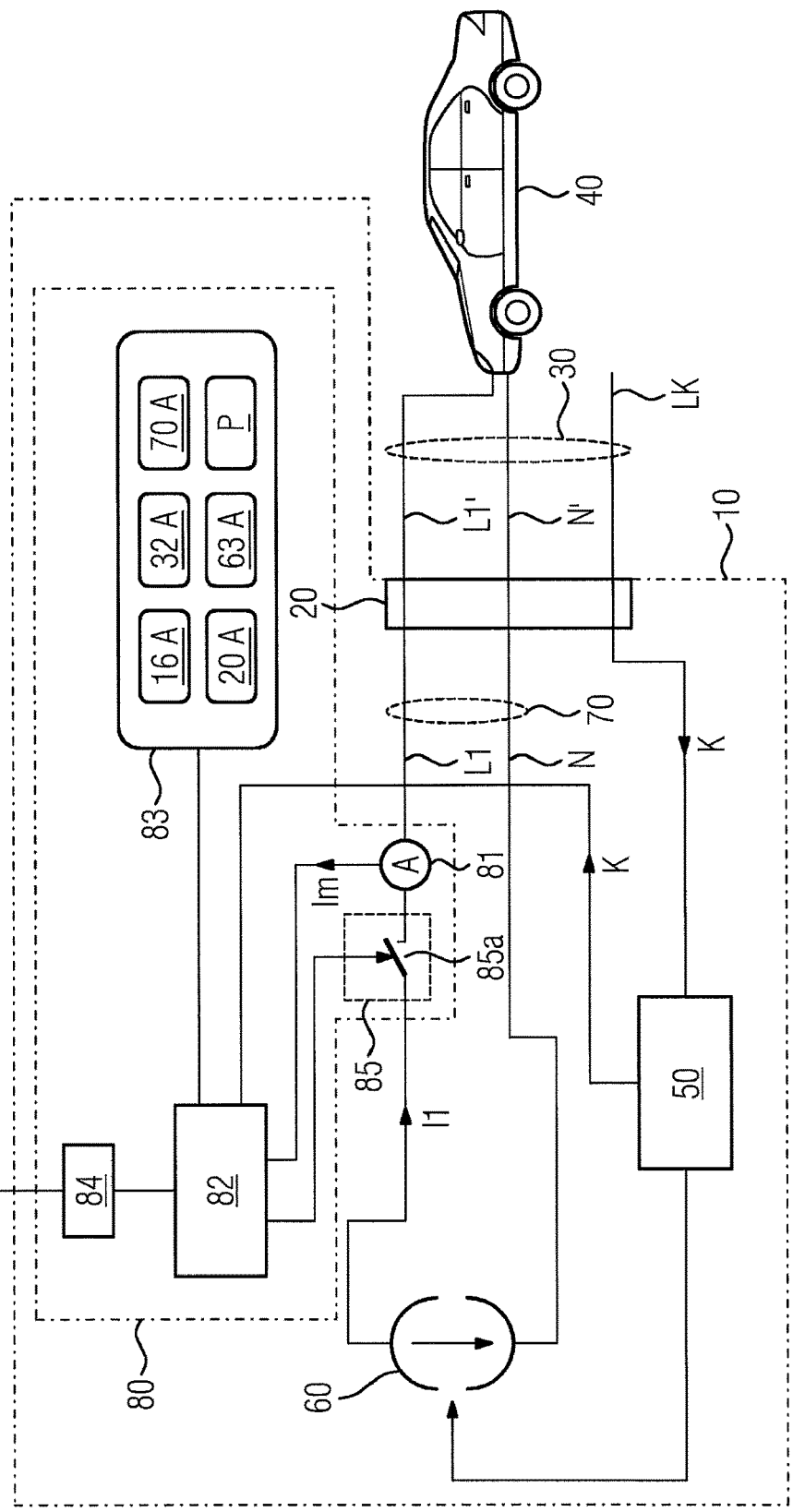
FIG. 1 shows a first exemplary embodiment of an arrangement having a proposed charging station, to which an electric vehicle is connected via a charging cable.

Reference will now be made in detail to the preferred embodiments of the present invention, examples of which are illustrated in the accompanying drawings, wherein like reference numerals refer to like elements throughout.

In the figures, the same reference signs are always used for identical or comparable components, for the sake of clarity.

FIG. 1 reveals a charging station 10 which has a charging connection 20, for example in the form a cable socket. A charging cable 30 is connected to the charging connection 20 of the charging station 10, said charging cable electrically connecting the charging connection 20 to an electric vehicle 40. The electric vehicle 40 is charged by the charging station 10 via the charging cable 30.

The charging station 10 comprises a control device 50 which is connected to the charging connection 20. The control device 50 controls a controllable current source 60, which generates the charging current I1 provided for charging the electric vehicle 40.

A feed line 70 is connected to the charging connection 20, which feed line connects the charging connection 20 to the controllable current source 60 and enables the feeding in of charging current I1 into the charging cable 30. In the exemplary embodiment according to FIG. 1, the feed line 70 is a single-phase feed line and has a phase conductor L1 and a return conductor N.

FIG. 1 shows that the charging cable 30 is likewise a single-phase charging cable and comprises two current-conducting conductors which are denoted with the reference signs L1' and N'. The conductor L1' is in this case connected to the phase conductor L1 of the feed line 70 and the conductor N' is connected to the return conductor N of the feed line 70. In addition, the charging cable 30 comprises an identifier conductor LK, which enables a load capacity identifier K specifying the electric load capacity of the charging cable 30 to be read. The load capacity identifier K can specify, for example, that the charging cable 30 may be loaded with a maximum current of 16 A, 20 A, 32 A, 63 A or 70 A.

FIG. 1 also reveals that the charging station 10 comprises an overload protection device 80 which is connected to the feed line 70. The overload protection device 80 comprises a current measuring device 81, which measures the current in the phase conductor L1 of the feed line 70 and generates a corresponding measured current value Im. A calculation device 82 of the overload protection device 80 is connected to the current measuring device 81. A memory 83, in which a program module P is stored, is connected to said calculation device 82. The program module P contains the control program which defines the operating mode of the calculation device 82 for monitoring the charging station 10.

In addition to the program module P, identifier-specific tripping criteria, which are denoted with the reference signs I16A, I20A, I32A, I63A and I70A, are stored in the memory 83. The identifier-specific tripping criteria can be, for example, tripping characteristics or tripping curves or, alternatively, maximum values, such as maximum current values, maximum power values or maximum energy values, for example.

Furthermore, the overload protection device 80 comprises an interface module 84 which is connected to the calculation device 82. The interface module 84 enables remote parameter setting of the overload protection device 80: by way of example, the parameters of program module P and, as a result, the operating mode of the calculation device 82 can be remotely set from the outside by the interface module 84. In addition or alternatively, it is possible for the identifier-specific tripping criteria I16A to I70A to be replaced by other identifier-specific tripping criteria, if this appears to be necessary or advantageous.

In addition, the overload protection device 80 is equipped with a switching device 85 which comprises a switch 85a. The switch 85a is connected to the phase conductor L1 of the feed line 70 and is able to disconnect the charging current I1 through the phase conductor L1 and, as a result, the charging current through the feed line 70 as a whole when a corresponding control signal ST is generated by the calculation device 82.

The arrangement according to FIG. 1 can for example be operated as follows:

once the charging cable 30 has been connected to the charging connection 20 of the charging station 10 and therefore an electrical connection has been established between the electric vehicle 40 and the charging station 10, the control device 50 can read the load capacity identifier K from the identifier conductor LK, which is connected to the charging connection 20, of the charging cable 30. By way of example, the load capacity identifier K can specify the maximum charging current with which the charging cable 30 can be loaded. In the following text, it will be assumed by way of example that the load capacity identifier K indicates a maximum charging current of 32 A. Thus, the control device 50 will actuate the controllable current source 60 such that the charging current I1 absolutely does not exceed the maximum predefined charging current of 32 A or at least does not permanently exceed it.

During the charging process, the overload protection device 80 will, at the same time or additionally, monitor the charging process and interrupt the charging process by the switching device 85 or by the switch 85a if the maximum charging current of 32 A is exceeded temporarily or for longer than a predefined time period. For this purpose, the calculation device 82 will read the load capacity identifier K specifying the load capacity of the charging cable 30 from the control device 50. On the basis of the load capacity identifier K, the calculation device 82 will then in turn read the memory 83 and read an identifier-specific tripping criterion corresponding to the load capacity identifier K from the memory 83. Since the load capacity identifier K specifies a maximum current of 32 A, the calculation device 82 in the exemplary embodiment according to FIG. 1 will read the identifier-specific tripping criterion I32A from the memory 83 and use it to evaluate the measured current value Im.

The calculation device 82 will evaluate the measured current values Im on the basis of the read identifier-specific tripping criterion I32A and check whether the charging cable 30 is overloaded. In the simplest case, the calculation device 82 can always operate the switching device 85 whenever the measured current value Im indicates a charging current that is higher than the maximum current value of 32 A. However, it is considered to be particularly advantageous if, in the event of the maximum current value of 32 A being exceeded, the calculation device 82 does not interrupt the charging process immediately but rather firstly waits to see whether the charging current I1 permanently or persistently exceeds the maximum current value of 32 A. By way of example, the calculation device 82 can integrate the measured current value Im over a predefined time window and then generate a control signal ST for switching the switch 85a to the off state only if the integral exceeds a predefined limit value. The type of evaluation of the measured current values Im and the procedure for generating the control signal ST for disconnecting the switch 85a are determined by the identifier-specific tripping criterion (or the identifier-specific tripping criteria) I32A. The tripping criterion I32A can contain limit values, such as maximum current values or maximum integral values, for example, and calculation instructions which are to be applied to the measured values Im in order to come to a decision about the continuation or the termination of the charging process. The term tripping criterion is therefore intended to be understood in the widest sense thereof.

If, when the tripping criterion I32A are applied to the measured current values Im, the calculation device 82 determines that the charging cable 30 is overloaded, then said calculation device will generate a control signal ST by which the switch 85a of the switching device 85 is opened and the charging process is interrupted.

As can be seen from the above statements, the charging station 10 according to FIG. 1 is distinguished in that the charging process can be monitored by a single overload protection device 80, although the charging processes can be performed with different charging currents by using different load capacity identifiers K. This is possible because the overload protection device 80 is connected to the central feed line 70 and monitors the feed line 70 on the basis of the respective load capacity identifier K.

Figure 2:
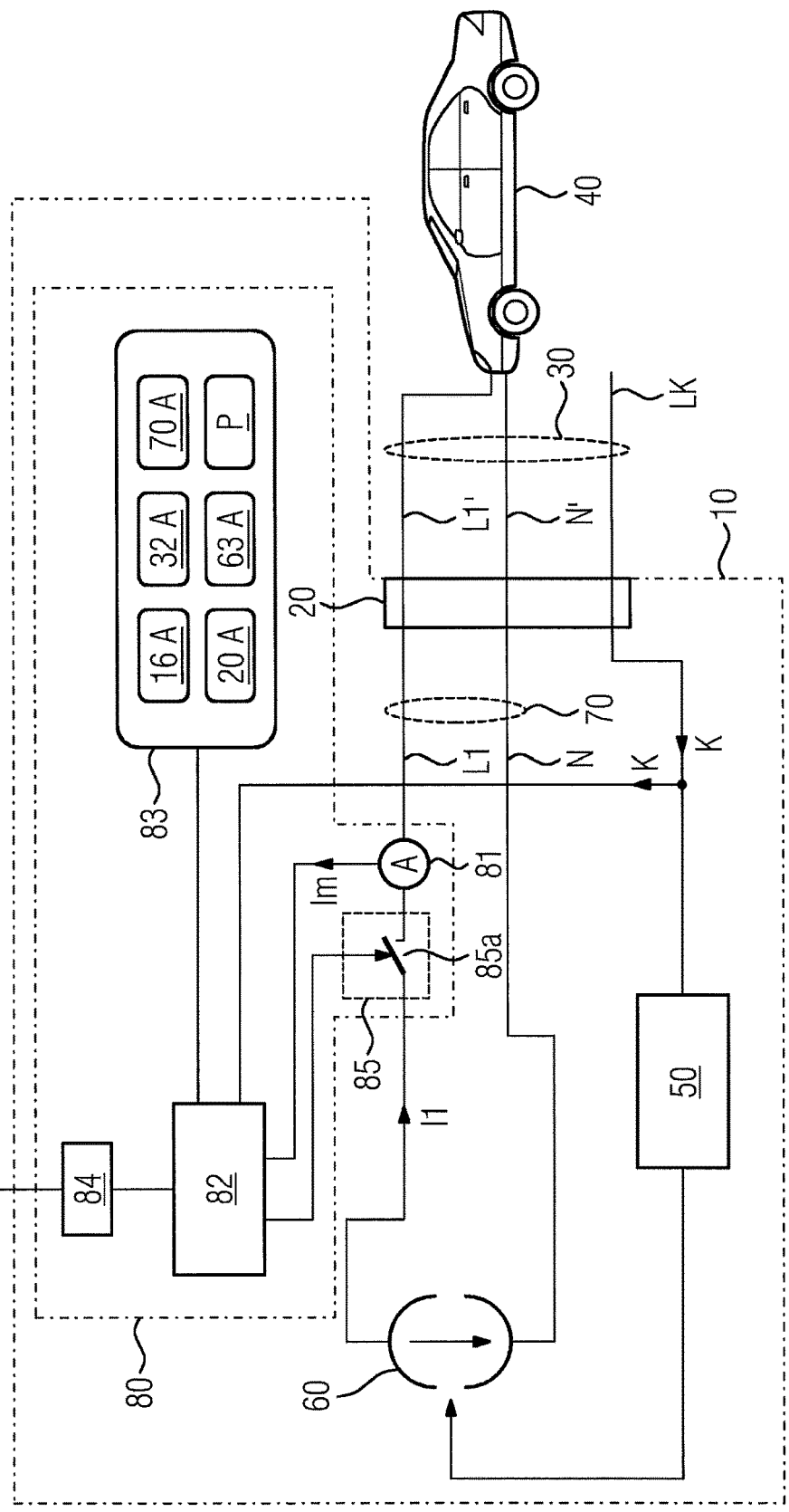
FIG. 2 shows a second exemplary embodiment of an arrangement having a charging station, wherein an overload protection device of the charging station is directly connected to an identifier conductor of the charging cable and reads a load capacity identifier of the charging cable.

FIG. 2 shows an arrangement having a charging station 10 in which the overload protection device 80 is directly connected to the charging connection 20 of the charging station 10, with the result that the identifier conductor LK of the charging cable 30 can be connected to the overload protection device 80. This makes it possible for the overload protection device 80 to read the load capacity identifier K directly from the charging cable 30 and to monitor the feed line 70 in a load-capacity-identifier-specific manner independently of the control device 50.

In contrast to the exemplary embodiment according to FIG. 1, the overload protection device 80 can thus monitor the feed line 70 while individually taking into account the load capacity of the charging cable 30, without the control device 50 needing to be involved. Thus, even if the control device 50 is operating ineffectively or is completely defective, the overload protection device 80 can prevent too high a charging current I1 from being fed into the charging cable 30 since, in contrast to the embodiment according to FIG. 1, the overload protection device 80 according to FIG. 2 is not dependent on the involvement of the control device 50 with regard to obtaining the load capacity identifier K.

Figure 3:
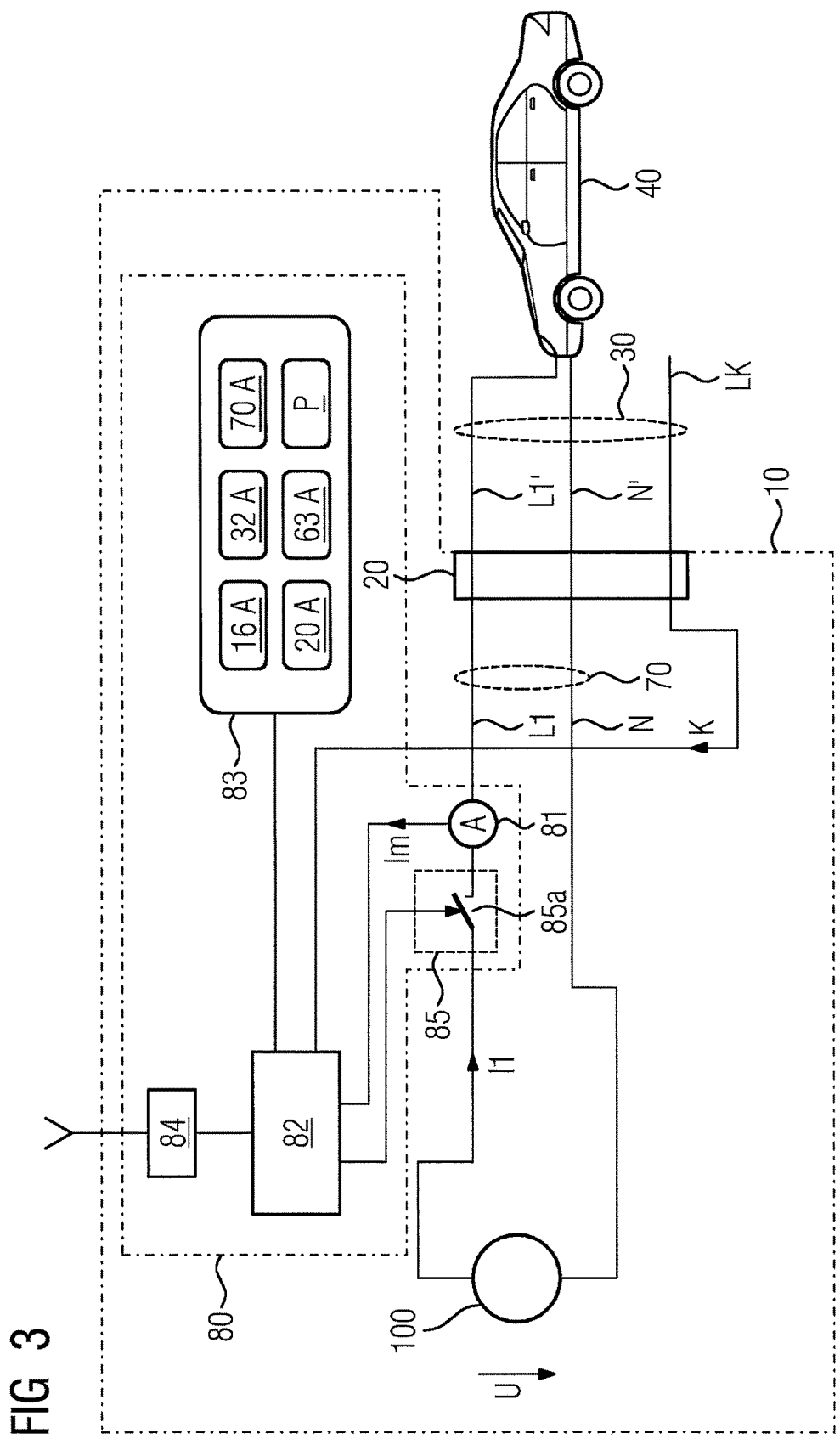
FIG. 3 shows a third exemplary embodiment of an arrangement having a charging station, wherein the electric vehicle is charged by a voltage source.

FIG. 3 shows an exemplary embodiment of an arrangement having a charging station 10 and an electric vehicle 40, in the case of which arrangement the electric vehicle 40 is charged by a voltage source 100. Thus, as soon as the charging cable 30 connects the electric vehicle 40 to the charging station 10, a charging current I1 will flow from the voltage source 100 in the direction of the electric vehicle 40. In this case, the charging process is monitored solely by the overload protection device 80, which reads the load capacity identifier K specifying the load capacity of the charging cable 30 via the identifier conductor LK of the charging cable 30.

The calculation device 82 of the overload protection device 80 can therefore, as has been described in detail in connection with FIG. 1, monitor the charging current I1 and, in the event of an identifier-specific tripping criterion stored in the memory 83 being exceeded, open the switch 85a of the switching device 85 if the recorded measured current values Im are too high according to the identifier-specific tripping criterion or criteria and an overload of the charging cable occurs or is imminent.

Figure 4:
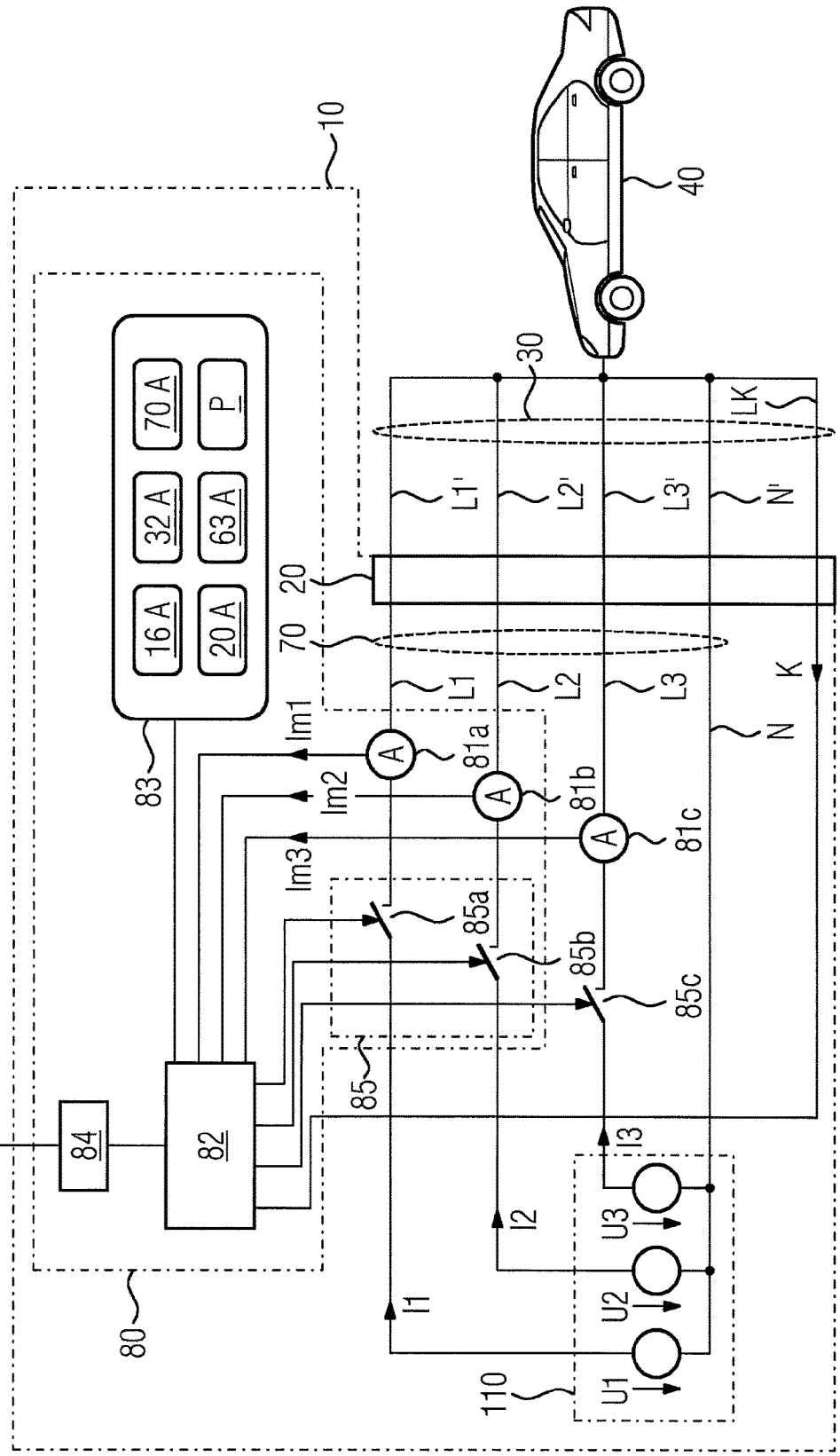
FIG. 4 shows a fourth exemplary embodiment of an arrangement having a charging station, wherein a three-phase charging cable is connected to a three-phase feed line of the charging station.

FIG. 4 shows an exemplary embodiment in which the charging cable 30 is a three-phase charging cable and comprises three current-conducting phase conductors L1', L2' and L3' and a return conductor N'. In addition to the four conductors mentioned, an identifier conductor LK, which enables a load capacity identifier K to be read, is present.

The charging connection 20 of the charging station 10 is accordingly likewise configured for a three-phase connection. Thus, FIG. 4 reveals that a three-phase feed line 70 is connected to the charging connection 20, which three-phase feed line comprises three phase conductors L1, L2 and L3 and a return conductor N. The charging connection 20 is connected to a three-phase current or voltage source 110 via said three-phase feed line 70, which current or voltage source feeds the charging current in the form of phase currents I1, I2 and I3 into the charging cable 30 and therefore the electric vehicle 40 via the three-phase feed line 70 and the charging connection 20 in an uncontrolled manner (or, alternatively, under the control of a control device—not shown in FIG. 4).

In contrast to the exemplary embodiments in FIGS. 1 to 3, the overload protection device 80 according to FIG. 4 is likewise of three-phase design. It comprises three current measuring devices 81a, 81b and 81c which are arranged in the phase conductors L1, L2 and L3 of the feed line 70. The phase-specific measured current values Im1, Im2 and Im3 measured by the current measuring devices arrive at the calculation device 82 which evaluates said measured current values in a phase-specific manner. In this case, the calculation device 82 uses the load capacity identifier K which it obtains directly from the charging connection 20 or from the identifier conductor LK of the charging cable 30.

In the case of the exemplary embodiment according to FIG. 4, there is thus also a direct connection between the overload protection device 80 and the charging connection 20 in order to enable the load capacity identifier K to be read directly by the overload protection device 80 without mediation of other components of the charging station 10.

If, after reading the identifier-specific tripping criterion or criteria, the calculation device 82 determines that the measured phase-current values Im1, Im2 and/or Im3 are too high, then it will interrupt the charging process by either disconnecting only those phase conductors L1, L2 and/or L3 that are affected by the overload or, alternatively, interrupting the entire charging process by disconnecting all of the phase conductors L1, L2 and L3 even if only individual phase conductors are affected.

In order to disconnect individual phase conductors or all of the phase conductors, the overload protection device 80 according to FIG. 4 is equipped with a switching device 85 that comprises in total three switches 85a, 85b and 85c. The three switches are in each case assigned to a phase conductor of the feed line 70 and enable phase-specific disconnection of the feed line 70.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A charging station comprising:
   an electric charging connection configured to connect a charging cable of an electric vehicle; the charging station configured to read, at the electric charging connection, a load capacity identifier specifying an electrical load capacity of the charging cable;
   a polyphase feed line connected to the electric charging connection to carry a charging current to the electric charging connection of the charging station; and
   an overload protection device with automatic switchover having a switching device configured to connect to the polyphase feed line and monitor the polyphase feed line to disconnect the charging current flowing through the feed line in response to an overload, the switching device comprising an individually and independently actuable switch for each phase of the polyphase feed line,
   wherein the overload protection device selects an identifier-specific tripping criterion assigned to the load capacity identifier of the charging cable and stored in the overload protection device, monitors the individual phases of the polyphase feed line, compares each individual phase to the selected tripping criterion, and disconnects the polyphase feed line on the basis of any individual phase of the polyphase feed line exceeding the selected tripping criterion.

2. The charging station as claimed in claim 1, wherein the overload protection device comprises a memory in which a plurality of identifier specific tripping criteria are stored, and the overload protection device comprises a calculation device which is connected to the memory and is configured to read from the memory, on the basis of the load capacity identifier of the charging cable, the identifier-specific tripping criterion which is assigned to the load capacity identifier and stored in the memory.

3. The charging station as claimed in claim 1, wherein the overload protection device is directly connected to the electric charging connection and can read the load capacity identifier of the charging cable by itself.

4. The charging station as claimed in claim 2, wherein the overload protection device comprises a measuring device which is connected to the calculation device and determines a measured value that specifies a loading of the polyphase feed line, and transfers the measured value to the calculation device.

5. The charging station as claimed in claim 4, wherein the measuring device comprises a current measuring device that measures the charging current through the polyphase feed line.

6. The charging station as claimed in claim 1, wherein the overload protection device with automatic switchover monitors a phase of the polyphase feed line.

7. The charging station as claimed in claim 1, wherein the overload protection device is configured to determine that a particular phase of the polyphase feed line exceeds the selected tripping criterion, and in response, individually disconnect the actuable switch corresponding with the particular phase of the polyphase feed line independently of the actuable switches corresponding with the other phases of the polyphase feed line.

8. The charging station as claimed in claim 1, wherein the overload protection device is configured to disconnect the phase of the polyphase feed line regardless of a symmetry of a charging current loading in a plurality of phases of the polyphase feed line.

9. The charging station as claimed in claim 1, wherein the overload protection device comprises an interface module, and a control device of the overload protection device is connected to the interface module and changes the identifier-specific tripping criteria by remote parameter setting via the interface module.

10. A method for monitoring the charging process of a charging station comprising:
    reading a load capacity identifier of a charging cable connected to an electric charging connection of the charging station;
    monitoring a charging current in each phase of a polyphase feed line connected to the electric charging connection of the charging station;
    assigning an identifier-specific tripping criterion on the basis of the load capacity identifier of the charging cable;
    monitoring each phase of the polyphase feed line;
    comparing each individual phase of the polyphase feed line to the selected tripping criterion,
    determining, based on the comparing step, an overload in any individual phase of the polyphase feed line according to the selected tripping criterion; and
    disconnecting the respective polyphase feed line in response to the overload of the individual phase of the polyphase feed line.

11. The charging station as claimed in claim 1, wherein the identifier-specific tripping criterion assigned to the load capacity identifier is selected from the group consisting of a maximum current value, a tripping characteristic, and a calculation guideline.

12. The charging station as claimed in claim 1, wherein the identifier-specific tripping criterion is one of a plurality of identifier-specific tripping criteria assigned to the load capacity identifier of the charging cable.

13. The method as claimed in claim 10, comprising:
storing in a memory a plurality of identifier specific tripping criteria, and
reading from the memory, on the basis of the load capacity identifier of the charging cable, the identifier-specific tripping criterion which is assigned to the load capacity identifier and stored in the memory.

14. The method as claimed in claim 10, wherein reading the load capacity identifier of the charging cable connected to the electric charging connection of the charging station comprises reading the load capacity identifier by an overload protection device of the charging station connected directly to the electric charging connection.

15. The method as claimed in claim 10, comprising determining, by a measuring device of the charging station, a measured value that specifies a loading of the polyphase feed line.

16. The method as claimed in claim 15, comprising measuring, by the measuring device of the charging station, a charging current through the polyphase feed line.

17. The method as claimed in claim 10, comprising:
determining, based on the comparing step, an overload in a particular phase of the polyphase feed line according to the selected tripping criterion; and
in response to the overload of the particular phase of the polyphase feed line, disconnecting the particular polyphase feed line independently of the other phases of the polyphase feed line.

18. The method as claimed in claim 17, comprising disconnecting the particular polyphase feed line regardless of a symmetry of a charging current loading in the plurality of phases of the polyphase feed line.

19. The method as claimed in claim 10, wherein the identifier-specific tripping criterion assigned to the load capacity identifier is selected from the group consisting of a maximum current value, a tripping characteristic, and a calculation guideline.

20. The method as claimed in claim 10, wherein the identifier-specific tripping criterion is one of a plurality of identifier-specific tripping criteria assigned to the load capacity identifier of the charging cable.

\* \* \* \* \*